United States Patent
Wells et al.

(10) Patent No.: US 10,484,048 B2
(45) Date of Patent: Nov. 19, 2019

(54) MOBILE RADIO COMMUNICATION DEVICES, COMMUNICATION DEVICES, METHODS FOR CONTROLLING A MOBILE RADIO COMMUNICATION DEVICE, AND METHODS FOR CONTROLLING A COMMUNICATION DEVICE

(71) Applicant: RAZER (ASIA-PACIFIC) PTE. LTD., Singapore (SG)

(72) Inventors: Stuart Wells, San Francisco, CA (US); Luca Di Fiore, New Taipei (TW)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 86 days.

(21) Appl. No.: 15/565,502

(22) PCT Filed: Apr. 10, 2015

(86) PCT No.: PCT/SG2015/000119
§ 371 (c)(1),
(2) Date: Oct. 10, 2017

(87) PCT Pub. No.: WO2016/163945
PCT Pub. Date: Oct. 13, 2016

(65) Prior Publication Data
US 2018/0083667 A1    Mar. 22, 2018

(51) Int. Cl.
*H04B 5/00* (2006.01)
*H04M 1/725* (2006.01)
*H04W 4/80* (2018.01)

(52) U.S. Cl.
CPC ........ *H04B 5/0031* (2013.01); *H04M 1/7253* (2013.01); *H04W 4/80* (2018.02); *H04M 2250/04* (2013.01)

(58) Field of Classification Search
CPC ..... H04B 5/0031; H04B 5/0025; H04W 4/80; H04W 12/00407; H04M 1/7253; H04M 2250/04
(Continued)

(56) References Cited

U.S. PATENT DOCUMENTS

| | | | |
|---|---|---|---|
| 9,083,679 B2 * | 7/2015 | Teruyama | ........... H04L 12/6418 |
| 9,661,479 B2 * | 5/2017 | Teruyama | ........... H04L 12/6418 |

(Continued)

FOREIGN PATENT DOCUMENTS

| | | |
|---|---|---|
| CN | 103607780 A | 2/2014 |
| CN | 104185092 A | 12/2014 |

OTHER PUBLICATIONS

Extended European Search Report dated Mar. 28, 2018, 6 pages, for the corresponding European Patent Application No. 15888628.3.
(Continued)

*Primary Examiner* — Sonny Trinh
(74) *Attorney, Agent, or Firm* — Polsinelli PC

(57) ABSTRACT

A mobile radio communication device is provided. The mobile radio communication device include; a near field communication interface configured to communicate with a near field communication device using a near field communication standard; a further communication interface configured to communicate with a further communication device using a further communication standard; and a conversion circuit configured to convert information between the near field communication standard and the further communication standard.

20 Claims, 4 Drawing Sheets

(58) Field of Classification Search
USPC .......................................................... 455/41.1
See application file for complete search history.

(56) References Cited

U.S. PATENT DOCUMENTS

| | | |
|---|---|---|
| 2010/0058359 A1 | 3/2010 | Ferlitsch |
| 2011/0102155 A1 | 5/2011 | Choi et al. |
| 2012/0309302 A1* | 12/2012 | Buhot ................ G06K 7/10237 |
| | | 455/41.1 |
| 2012/0329386 A1 | 12/2012 | Reyner |
| 2013/0159178 A1 | 6/2013 | Colon et al. |
| 2013/0283628 A1 | 10/2013 | Pearson |
| 2014/0220890 A1 | 8/2014 | Bukovjan et al. |
| 2015/0271677 A1* | 9/2015 | Van Nieuwenhuyze .................... |
| | | H04W 12/08 |
| | | 455/41.1 |
| 2015/0325118 A1 | 11/2015 | Yu |

OTHER PUBLICATIONS

Stuart Wells, "Wireless 802.11 Kernel Link Emulation," GitHub. com, Mar. 4, 2016, 13 pages (Available online at https://github. com/stuartwells4/klem/blob/master/presentation.pdf, last visited Dec. 19, 2017).

Office Action (including English Translation) dated Mar. 11, 2019, for the corresponding Taiwanese Application No. 105102533 in 13 total pages.

\* cited by examiner

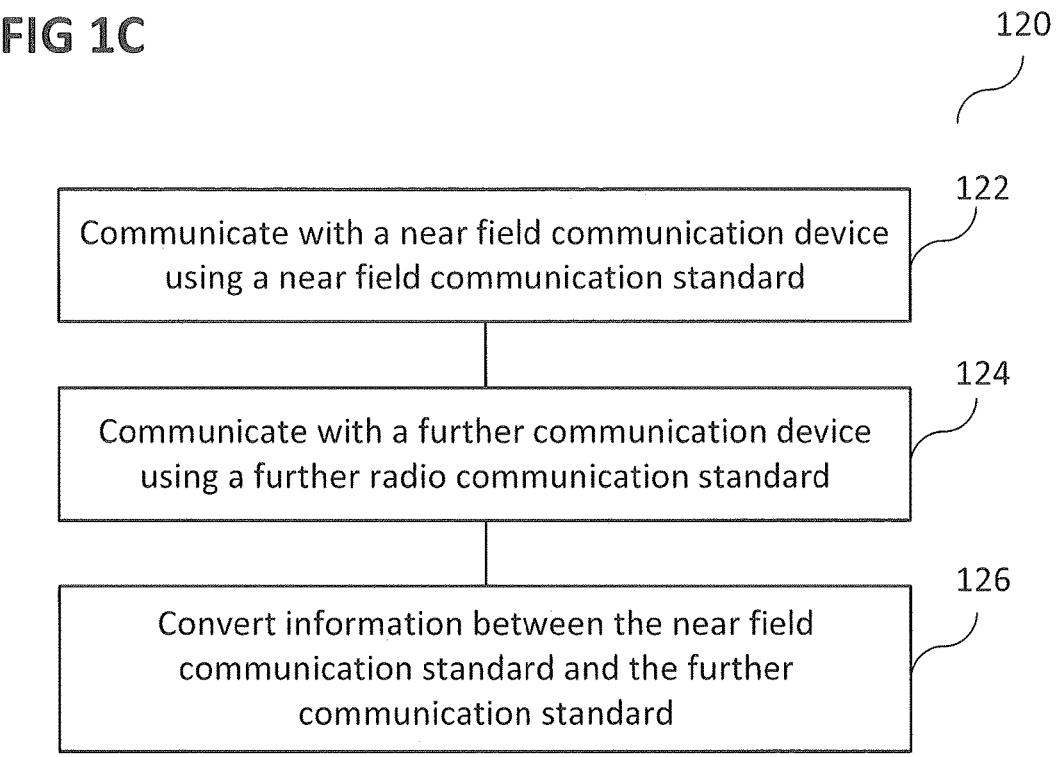
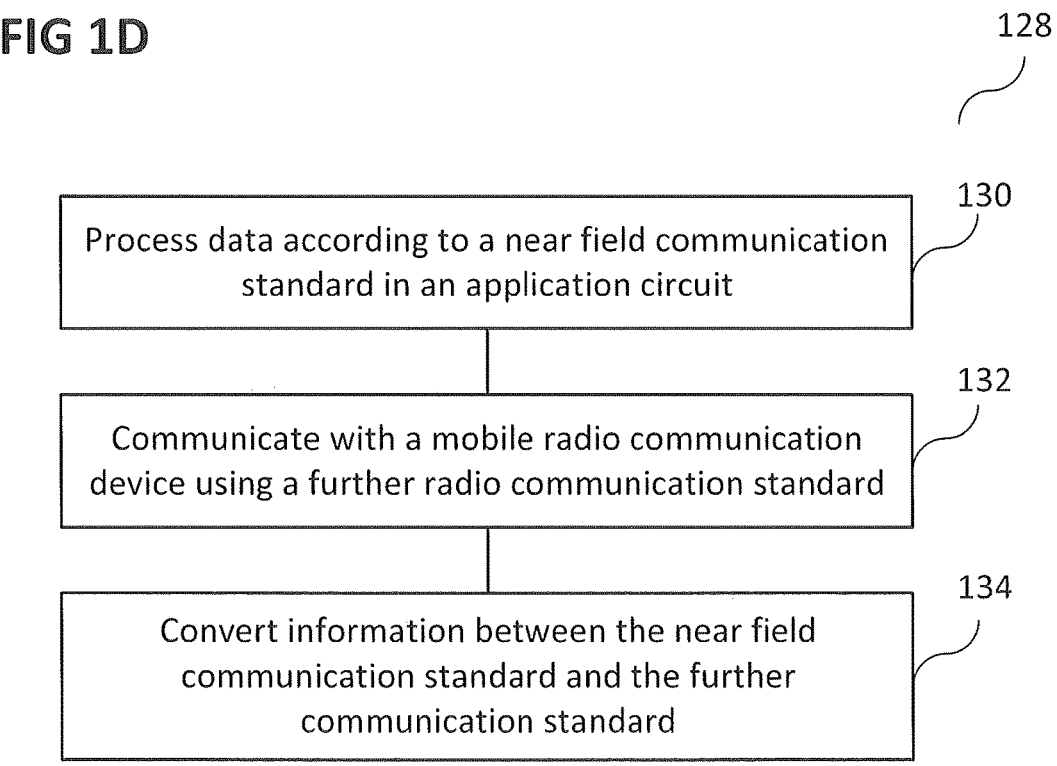

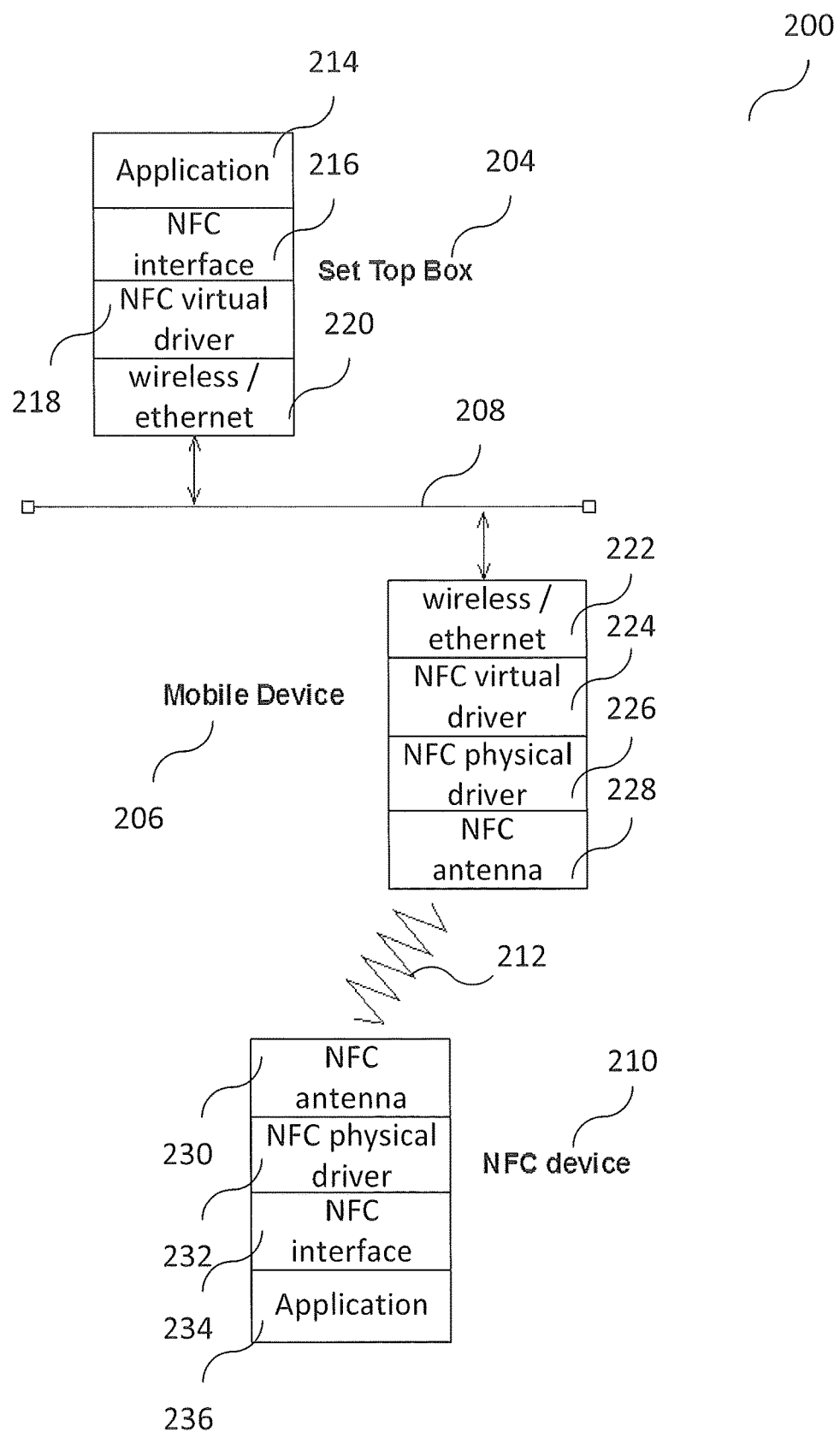

MOBILE RADIO COMMUNICATION DEVICES, COMMUNICATION DEVICES, METHODS FOR CONTROLLING A MOBILE RADIO COMMUNICATION DEVICE, AND METHODS FOR CONTROLLING A COMMUNICATION DEVICE

TECHNICAL FIELD

Various embodiments generally relate to mobile radio communication devices, communication devices, methods for controlling a mobile radio communication device, and methods for controlling a communication device.

BACKGROUND

NFC (Near Field Communication) is widely used. Thus, there may be a need for efficient NFC communication.

SUMMARY OF THE INVENTION

According to various embodiments, a mobile radio communication device may be provided. The mobile radio communication device may include: a near field communication interface configured to communicate with a near field communication device using a near field communication standard; a further communication interface configured to communicate with a further communication device using a further radio communication standard; and a conversion circuit configured to convert information between the near field communication standard and the further communication standard.

According to various embodiments, a communication device, for example a set top box, may be provided. The communication device may include: an application circuit configured to process data according to a near field communication standard; a radio communication interface configured to communicate with a mobile radio communication device using a further radio communication standard; and a conversion circuit configured to convert information between the near field communication standard and the further communication standard.

According to various embodiments, a method for controlling a mobile radio communication device may be provided. The method may include: communicating with a near field communication device using a near field communication standard; communicating with a further communication device using a further radio communication standard; and converting information between the near field communication standard and the further communication standard.

According to various embodiments, a method for controlling a communication device, for example a set top box, may be provided. The method may include: processing data according to a near field communication standard in an application circuit; communicating with a mobile radio communication device using a further radio communication standard; and converting information between the near field communication standard and the further communication standard.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which:

FIG. 1C shows a flow diagram illustrating a method for controlling a mobile radio communication device according to various embodiments;

FIG. 1D shows a flow diagram illustrating a method for controlling a communication device, for example a set top box, according to various embodiments; and FIG. 2 and FIG. 3 show systems according to various embodiments.

DETAILED DESCRIPTION

Figure 1A:
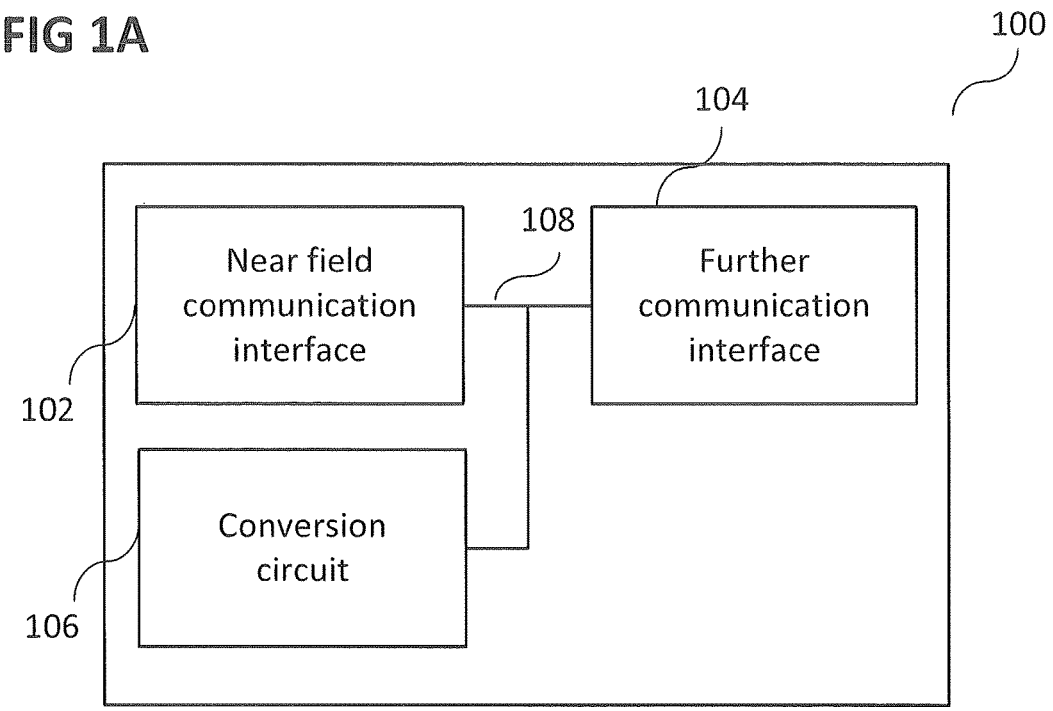
FIG. 1A shows a mobile radio communication device (in other words: a mobile device) according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the mobile radio communication device as described in this description may include a memory which is for example used in the processing carried out in the mobile radio communication device In this context, the set top box as described in this description may include a memory which is for example used in the processing carried out in the set top box. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a Microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed or attached, or just in contact without any fixation, and it will be understood that both direct coupling or indirect coupling (in other words: coupling without direct contact) may be provided.

NFC (Near Field Communication) is widely used. According to various embodiments, devices and methods may be provided for efficient NFC communication.

According to various embodiments, set top boxes NFC relay using smartphones may be provided.

According to various embodiments, devices and methods may be provided for relaying NFC (Near Field Communication) data wirelessly from mobile devices with NFC capabilities to set top boxes that do not have NFC capabilities so that a user playing NFC-capable video games or applications on a mobile device can play the same video game or application executed on a set top box on a remote display device. The application (for example a payment system application or a game) executed on the set top box may use a remote display (for example TV set). The NFC device may be provided on the mobile device (for example a smart phone).

According to various embodiments, set top box NFC relays may be provided.

FIG. 1A shows a mobile radio communication device 100 according to various embodiments. The mobile radio communication device 100 may include a near field communication interface 102 (in other words: a near field communication interface circuit) configured to communicate with a near field communication device using a near field communication standard. The mobile radio communication device 100 may further include a further communication interface 104 (in other words: a further communication interface circuit) configured to communicate with a further communication device using a further radio communication standard. The mobile radio communication device 100 may further include a conversion circuit 106 configured to convert information between the near field communication standard and the further communication standard. The near field communication interface 102, the further communication interface 104, and the conversion circuit 106 may be coupled with each other, like indicated by lines 108, for example electrically coupled, for example using a line or a cable, and/or mechanically coupled.

In other words, the mobile radio communication device may translate between NFC and non-NFC communication, and may relay data between an NFC device and a non-NFC device.

According to various embodiments, the conversion circuit 106 may include or may be or may be included in or may use a hardware abstraction layer.

According to various embodiments, the conversion circuit 106 may include or may be or may be included in or may use a near field communication virtual driver.

According to various embodiments, the conversion circuit 106 may further be configured to encapsulate near field communication data in data according to the further radio communication standard.

According to various embodiments, the conversion circuit 106 may further be configured to extract near field communication data from data according to the further radio communication standard.

According to various embodiments, the conversion circuit 106 may include or may be or may be included in or may use a near field communication library.

According to various embodiments, the further radio communication standard may be different from the near field communication standard (for example a WiFi standard or a Bluetooth standard).

Figure 1B:
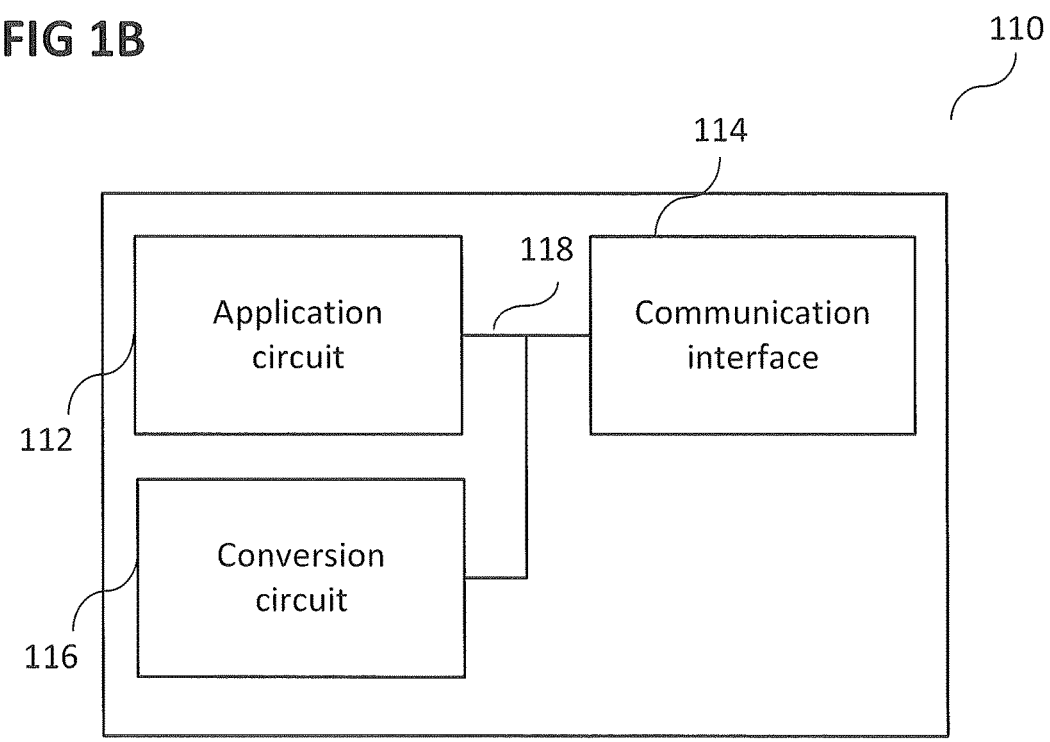
FIG. 1B shows a communication device, for example a set top box, according to various embodiments.

FIG. 1B shows a communication device, for example a set top box, 110 according to various embodiments. The communication device 110 may include an application circuit 112 configured to process data according to a near field communication standard. The communication device 110 may further include a radio communication interface configured to communicate with a mobile radio communication device using a further radio communication standard. The communication device 110 may further include a conversion circuit 116 configured to convert information between the near field communication standard and the further communication standard. The application circuit 112, the communication interface 114, and the conversion circuit 116 may be coupled with each other, like indicated by lines 118, for example electrically coupled, for example using a line or a cable, and/or mechanically coupled.

According to various embodiments, the conversion circuit 116 may include or may be or may be included in or may use a hardware abstraction layer.

According to various embodiments, the conversion circuit 116 may include or may be or may be included in or may use a near field communication virtual driver.

According to various embodiments, the conversion circuit 116 may further be configured to encapsulate near field communication data in data according to the further radio communication standard.

According to various embodiments, the conversion circuit 116 may further be configured to extract near field communication data from data according to the further radio communication standard.

According to various embodiments, the conversion circuit 116 may include or may be or may be included in or may use a near field communication library.

According to various embodiments, the further radio communication standard may be different from the near field communication standard (for example a WiFi standard or a Bluetooth standard).

FIG. 1C shows a flow diagram 120 illustrating a method for controlling a mobile radio communication device according to various embodiments. In 122, it may be communicated with a near field communication device using a near field communication standard. In 124, it may be communicated with a further communication device using a further radio communication standard. In 126, information may be converted between the near field communication standard and the further communication standard.

According to various embodiments, the converting may include or may be using a hardware abstraction layer.

According to various embodiments, the converting may include or may be using a near field communication virtual driver.

According to various embodiments, the converting may include or may be encapsulating near field communication data in data according to the further radio communication standard.

According to various embodiments, the converting may include or may be extracting near field communication data from data according to the further radio communication standard.

According to various embodiments, the converting may include or may be using a near field communication library.

According to various embodiments, the further radio communication standard may be different from the near field communication standard.

FIG. 1D shows a flow diagram 128 illustrating a method for controlling a communication device, for example a set top box, according to various embodiments. In 130, data may be processed according to a near field communication standard in an application circuit. In 132, it may be communicated with a mobile radio communication device using a further radio communication standard. In 134, information may be converted between the near field communication standard and the further communication standard.

According to various embodiments, the converting may include or may be using a hardware abstraction layer.

According to various embodiments, the converting may include or may be using a near field communication virtual driver.

According to various embodiments, the converting may include or may be encapsulating near field communication data in data according to the further radio communication standard.

According to various embodiments, the converting may include or may be extracting near field communication data from data according to the further radio communication standard.

According to various embodiments, the converting may include or may be using a near field communication library.

According to various embodiments, the further radio communication standard may be different from the near field communication standard.

Various applications, for example software applications, for example videogames, may use NFC cards or other physical devices which include an NFC tag (for example dolls that have an NFC tag) as a new interaction mechanism between the physical world and the digital world (and a new monetization mechanism). A conventional set top box does not support NFC, but many phones, for example Google phones do. According to various embodiments, NFC packets may be relayed wirelessly from the smartphone to the set top box.

According to various embodiments, NFC packets may be relayed wirelessly between the smartphone and the set top box.

According to various embodiments, NFC may be used remotely. In other words, a physical object may be read, and routing of information between a local NFC antenna on the smart phone and a remote set top box may be provided.

According to various embodiments, a virtual HAL (Hardware Abstraction Layer) interface may be provided between the mobile device and the set top box and exposing the NFC to the set top box. According to various embodiments, the packets generated by the NFC layer may be encapsulated into a new packet that is transferred to the smart phone device. The smart phone system may then extract the original raw NFC packet and broadcast that data on its own antenna. Information which the mobile device received may then be encapsulated and set back the set top box. Any application on the set top box would not need to be recompiled, but it would assume it's working on local hardware.

According to various embodiments, a set top box operating system may present an NFC virtual interface/HAL layer representation for applications to use to interact with an actual NFC antenna on a remote smartphone/device. The virtual interface may be a device driver that encapsulated raw NFC packets into another packet containing specific NFC information header information. These encapsulated packets may then be sent to or received from the mobile device using an existing Wi-Fi 802.11 or Bluetooth network.

When the application receives an encapsulated NFC packet, it may strip out the NFC datagram and broadcast it raw through the NFC interface. If a packet is received from the NFC interface, the application may read that raw packet and then encapsulates it into a datagram and send the response back to the set top box.

FIG. 2 shows a system 200 according to various embodiments. A NFC device 210 may include an application 236, a NFC interface 234, an NFC physical driver 232, and an NFC antenna 230. The NFC antenna 230 of the NFC device 210 may communicate via NFC with an NFC antenna 228 of a mobile device 206, like indicated by 212. The mobile device 206 may further include an NFC physical driver 226, an NFC virtual driver 224, and a Ethernet (for example wireless) interface 222. The Ethernet interface 222 of the mobile device 206 may communicate with an Ethernet (for example wireless) interface 220 of a set top box 204, like indicated by 208. The set top box 204 may further include an NFC virtual driver 218, and NFC interface 216, and an application 214. It will be understood that although Ethernet is used as an example for a radio communication protocol different from NFC in FIG. 2, any radio communication protocol different from NFC may be used, for example Bluetooth, ZigBee, or infrared (for example IRDA).

According to various embodiments, the virtual HAL interface may create a command interface to encapsulate data and transfer it to the smart phone. An interface, for example a JAVA interface on the mobile may then communicate directly using its own NFC on the STB behalf. This may be similar to the method described above, but hidden under the NFC interfaces and may form a command and data encapsulation to transfer call to and from the smartphone device. The mobile device may then generate the raw NFC packet. In other words, encapsulation of raw NFC data may be provided. NFC has a data exchange format, known as NDEF (NFC Data Exchange Format). For example, the raw packet received from a OSI layer 2 point of view may be taken and wrapped up into a UDP (User Datagram Protocol) packet to be sent over WiFi. Once the packet is received on the set top box, the UDP may be removed, and the raw packet may be re-introduced back though a HAL layer. Any application may be unaware that the actual NFC device was remote. But the encapsulation may allow forwarding all traffic over WiFi.

According to various embodiments, a method may be to define an NFC virtual interface into a set of commands that may be encapsulated with associated data. The NFC commands and data may then be sent/received from the smartphone using Wi-Fi 802.11. This may still present a virtual HAL interface to applications, and they may not require development to be done to make use of the virtual NFC interface.

According to various embodiments, a set of JAVA libraries may be created to an application allowing it to use a remote NFC. This may require the set top box application to be developed to make use of this new library. The data communication from the set top box through JAVA may be routed to an application on the mobile device using Wi-Fi or Bluetooth. The mobile device application may then communicate to its local implementation for NFC and establish a connection. This may require apps to be developed to use a new library.

According to various embodiments, a library may be provided on the Set Top Box that provides an API (application programming interface) to control the NFC on a mobile device. Applications running the set top box may use this library to establish a communication channel with the mobile device. The mobile device may have its own application relay running that routes the set top box data, to the NFC device. A command structure may be defined on the Set Top Box, which allows the application to do the following: create an NFC session; scan for NFC devices near the mobile device; set up a socket or communication method using NFC to the remote device of the smart phone; send/receive NFC data packets, relayed from the mobile device to the Set Top Box application; and close NFC session.

Figure 3:
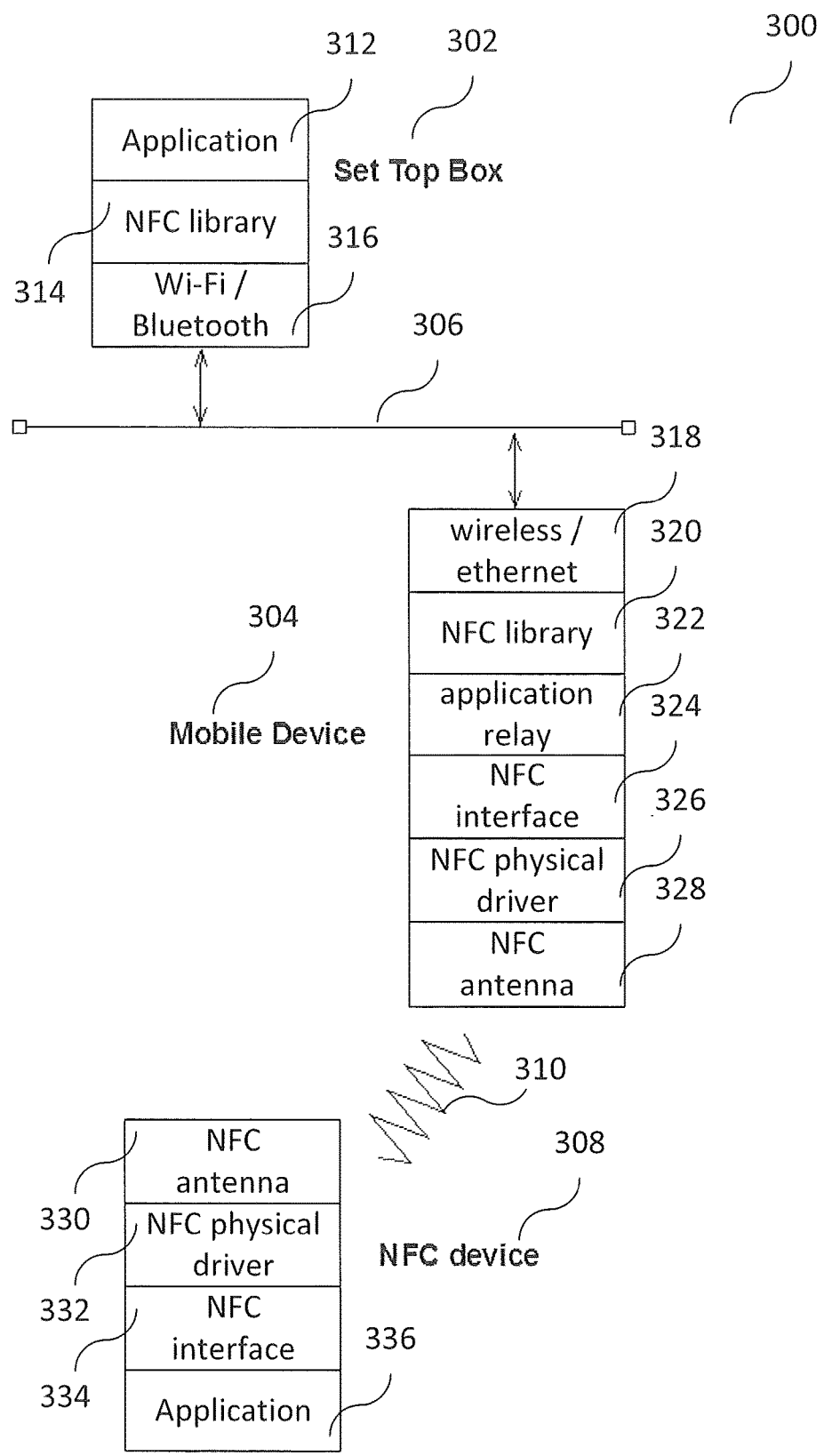

FIG. 3 shows a system 300 according to various embodiments. A NFC device 308 may include an application 336, an NFC interface 334, an NFC physical driver 332, and an NFC antenna 330. The NFC antenna 330 of the NFC device 308 may communicate via NFC with an NFC antenna 328 of a mobile device 304, like indicated by 310. The mobile device 304 may further include an NFC physical driver 326, and NFC interface 324, an application relay 322, an NFC library 320, and an Ethernet (for example wireless) interface 318. The Ethernet interface 318 of the mobile device 304 may communicate with an Ethernet interface 316 of a set top box 302, like indicated by 306. The set top box 302 may further include an NFC library 314 and an application 312. It will be understood that although Ethernet is used as an example for a radio communication protocol different from NFC in FIG. 3, any radio communication protocol different from NFC may be used, for example Bluetooth, ZigBee, or infrared (for example IRDA).

According to various embodiments, NFC (Near Field Communication) data may be relayed from NFC-enabled mobile devices to non-NFC enabled set top boxes so that a user playing NFC-capable video games or applications on a mobile device can play the same video game or application on a set top box on a remote display device.

According to various embodiments, NFC data may be relayed from NFC-enabled devices to a non-NFC enabled device to provide a medium for users to stream NFC data to a remote display device via the non-NFC enabled device.

According to various embodiments, the set top box may send encapsulated NFC packets or commands to a physical device that has an NFC antenna. The device with the antenna may broadcast the raw packets, or if commands are used, generate the NFC packets to the device in question. All received data may then be passed back to the set top box.

Various embodiments relate to relaying NFC data wirelessly from mobile devices with NFC capabilities to a set top box with no NFC capability so that a user playing NFC-capable electronic games or applications on a mobile device can play the same electronic game or application on a set top box on a remote display screen.

According to various embodiments, a system that relays near field communications (NFC) to a set top box, such as a video game console, that does not have NFC capabilities may be provided. In this manner, a user playing NFC-capable video games or applications on a mobile device can play the same video game or application on a set top box as would be possible from a remote display device.

In one possible embodiment of the invention, a set top box sends encapsulated NFC packets or commands to a physical device that has an NFC antenna. The device with the antenna will broadcast the raw packets, or if commands are used, generate the NFC packets to the set top box. All received data would then be passed back to the set top box to enable NFC functions.

This is based on the fact that it is possible to relay NFC packets wirelessly from the smartphone to the set top box. Thus one possible embodiment for this method would be used if a set top box operating system presented a NFC virtual interface or hardware abstraction layer (HAL) representation. In this case, applications could use the NFC or HAL to interact with set top box. The virtual interface could be a device driver that encapsulated raw NFC packets into another packet containing specific NFC information header information. These encapsulated packets would then be sent to or received from the mobile device using an existing Wi-Fi 802.11 or Bluetooth network. Thus, when the application receives the encapsulated NFC packet, it would strip out the NFC datagram and broadcast it raw through the NFC interface. When a packet is received from the NFC interface, the application reads that raw packet and then encapsulates it into a datagram and sends the response back to the set top box.

According to various embodiments, an NFC virtual interface may be defined into a set of commands that could be encapsulated with associated data. The NFC commands and data could then be sent and received from the smartphone using Wi-Fi 802.11. This would still present a virtual HAL interface to applications, and they would not require development to be done to make use of the virtual NFC interface.

Various embodiments may require a library to be created on the set top box. The library provides an API to control the NFC on a mobile device. Applications running the set top box would use this library to establish a communication channel with the mobile device. The mobile device would have its own application relay running, which could route the set top box data (NFC packets), to the NFC device. A command structure would be defined on the Set Top Box, which allows the application to do the following: Create an NFC session; Scan for NFC devices near the mobile device; Set up a socket or communication method using NFC to the remote device of the smart phone; Send/Receive NFC data packets, relayed from the mobile device to the Set Top Box application; and Close the NFC session.

Although the embodiments as described above and shown in the drawings utilizes a set top box, it is envisaged that other devices including portable computing devices such as laptops, tablets, smartphone devices can also be used in place of the set top box.

The following examples pertain to further embodiments.

Example 1 is a mobile radio communication device comprising: a near field communication interface configured to communicate with a near field communication device using a near field communication standard; a further communication interface configured to communicate with a further communication device using a further radio communication standard; and a conversion circuit configured to convert information between the near field communication standard and the further communication standard.

In example 2, the subject-matter of example 1 can optionally include that the conversion circuit comprises a hardware abstraction layer.

In example 3, the subject-matter of any one of examples 1 to 2 can optionally include that the conversion circuit comprises a near field communication virtual driver.

In example 4, the subject-matter of any one of examples 1 to 3 can optionally include that the conversion circuit is further configured to encapsulate near field communication data in data according to the further radio communication standard.

In example 5, the subject-matter of any one of examples 1 to 4 can optionally include that the conversion circuit is further configured to extract near field communication data from data according to the further radio communication standard.

In example 6, the subject-matter of any one of examples 1 to 5 can optionally include that the conversion circuit comprises a near field communication library.

In example 7, the subject-matter of any one of examples 1 to 6 can optionally include that the further radio communication standard is different from the near field communication standard.

Example 8 is a communication device comprising: an application circuit configured to process data according to a near field communication standard; a radio communication interface configured to communicate with a mobile radio communication device using a further radio communication standard; and a conversion circuit configured to convert information between the near field communication standard and the further communication standard.

In example 9, the subject-matter of example 8 can optionally include that the conversion circuit comprises a hardware abstraction layer.

In example 10, the subject-matter of any one of examples 8 to 9 can optionally include that the conversion circuit comprises a near field communication virtual driver.

In example 11, the subject-matter of any one of examples 8 to 10 can optionally include that the conversion circuit is further configured to encapsulate near field communication data in data according to the further radio communication standard.

In example 12, the subject-matter of any one of examples 8 to 11 can optionally include that the conversion circuit is further configured to extract near field communication data from data according to the further radio communication standard.

In example 13, the subject-matter of any one of examples 8 to 12 can optionally include that the conversion circuit comprises a near field communication library.

In example 14, the subject-matter of any one of examples 8 to 13 can optionally include that the further radio communication standard is different from the near field communication standard.

Example 15 is a method for controlling a mobile radio communication device, the method comprising: communicating with a near field communication device using a near field communication standard; communicating with a further communication device using a further radio communication standard; and converting information between the near field communication standard and the further communication standard.

In example 16, the subject-matter of example 15 can optionally include that the converting comprises using a hardware abstraction layer.

In example 17, the subject-matter of any one of examples 15 to 16 can optionally include that the converting comprises using a near field communication virtual driver.

In example 18, the subject-matter of any one of examples 15 to 17 can optionally include that the converting comprises encapsulating near field communication data in data according to the further radio communication standard.

In example 19, the subject-matter of any one of examples 15 to 18 can optionally include that the converting comprises extracting near field communication data from data according to the further radio communication standard.

In example 20, the subject-matter of any one of examples 15 to 19 can optionally include that the converting comprises using a near field communication library.

In example 21, the subject-matter of any one of examples 15 to 20 can optionally include that the further radio communication standard is different from the near field communication standard.

Example 22 is a method for controlling a communication device, the method comprising: processing data according to a near field communication standard in an application circuit; communicating with a mobile radio communication device using a further radio communication standard; and converting information between the near field communication standard and the further communication standard.

In example 23, the subject-matter of example 22 can optionally include that the converting comprises using a hardware abstraction layer.

In example 24, the subject-matter of any one of examples 22 to 23 can optionally include that the converting comprises using a near field communication virtual driver.

In example 25, the subject-matter of any one of examples 22 to 24 can optionally include that the converting comprises encapsulating near field communication data in data according to the further radio communication standard.

In example 26, the subject-matter of any one of examples 22 to 25 can optionally include that the converting comprises extracting near field communication data from data according to the further radio communication standard.

In example 27, the subject-matter of any one of examples 22 to 26 can optionally include that the converting comprises using a near field communication library.

In example 28, the subject-matter of any one of examples 22 to 27 can optionally include that the further radio communicatiPon standard is different from the near field communication standard.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:
1. A mobile radio communication device comprising:
a near field communication interface configured to communicate with a near field communication device using a near field communication standard;

a further communication interface configured to communicate with a further communication device using a further radio communication standard, wherein, to communicate with the further communication device using the further radio communication standard, the further communication interface is configured to receive encapsulated near field communication data from the further communication device using the further radio communication standard; and a conversion circuit configured to convert information between the near field communication standard and the further communication standard, wherein, to convert information between the near field communication standard and the further communication standard, the conversion circuit is configured to extract near field communication data from the encapsulated near field communication data received from the further communication device, wherein the near field communication interface is configured to send the extracted near field communication data to the near field communication device using the near field communication standard.

2. The mobile radio communication device of claim 1, wherein the conversion circuit comprises a hardware abstraction layer.

3. The mobile radio communication device of claim 1, wherein the conversion circuit comprises a near field communication virtual driver.

4. The mobile radio communication device of claim 1, wherein the near field communication interface is further configured to receive a second near field communication data from the near field communication device using the near field communication standard,
wherein the conversion circuit is further configured to encapsulate the second near field communication data according to the further radio communication standard.

5. The mobile radio communication device of claim 4, wherein the further communication interface is further configured to transmit the encapsulated second near field communication data to the further communication device according to the further radio communication standard.

6. The mobile radio communication device of claim 1, wherein the conversion circuit comprises a near field communication library.

7. The mobile radio communication device of claim 1, wherein the further radio communication standard is different from the near field communication standard.

8. A communication device comprising:
an application circuit configured to process near field communication data according to a near field communication standard, wherein the communication device is a non-near-field-communication enabled device;
a radio communication interface configured to communicate with a mobile radio communication device using a further radio communication standard, wherein, to communicate with the mobile radio communication device using the further radio communication standard, the radio communication interface is configured to send encapsulated near field communication data to the mobile radio communication device using the further radio communication standard; and
a conversion circuit configured to convert information between the near field communication standard and the further communication standard.

9. The communication device of claim 8, wherein the conversion circuit comprises a hardware abstraction layer.

10. The communication device of claim 8, wherein the conversion circuit comprises a near field communication virtual driver.

11. The communication device of claim 8, wherein, to communicate with the mobile radio communication device using the further radio communication standard, the radio communication interface is configured to receive a second encapsulated near field communication data from the mobile radio communication device using the further radio communication standard,
wherein, to convert information between the near field communication standard and the further communication standard, the conversion circuit is configured to encapsulate a first near field communication data in into the encapsulated near field communication data according to the further radio communication standard.

12. The communication device of claim 11, wherein the conversion circuit is further configured to extract a second near field communication data from the second encapsulated near field communication data according to the further radio communication standard.

13. The communication device of claim 8, wherein the conversion circuit comprises a near field communication library.

14. The communication device of claim 8, wherein the further radio communication standard is different from the near field communication standard.

15. A method for controlling a mobile radio communication device, the method comprising:
communicating with a near field communication device using a near field communication standard;
communicating with a further communication device using a further radio communication standard, wherein the communicating with the further communication device using the further radio communication standard comprises receiving encapsulated near field communication data from the further communication device using the further radio communication standard; and
converting information between the near field communication standard and the further communication standard, wherein the converting of information between the near field communication standard and the further communication standard comprises extracting near field communication data from the encapsulated near field communication data received from the further communication device, wherein the communicating with the near field communication device comprises sending the extracted near field communication data to the near field communication device using the near field communication standard.

16. The method of claim 15, wherein the converting comprises using at least one of a hardware abstraction layer, or a near field communication virtual driver.

17. The method of claim 15, wherein the converting of information between the near field communication standard and the further communication standard further comprises encapsulating a second near field communication data according to the further radio communication standard.

18. The method of claim 17, wherein the communicating with the further communication device using the further radio communication standard comprises transmitting the encapsulated second near field communication data to the further radio communication device using the further radio communication standard.

19. The method of claim 15,
wherein the converting comprises using a near field communication library.

20. The method of claim 15,
wherein the further radio communication standard is different from the near field communication standard.

\* \* \* \* \*